Patented Sept. 23, 1930

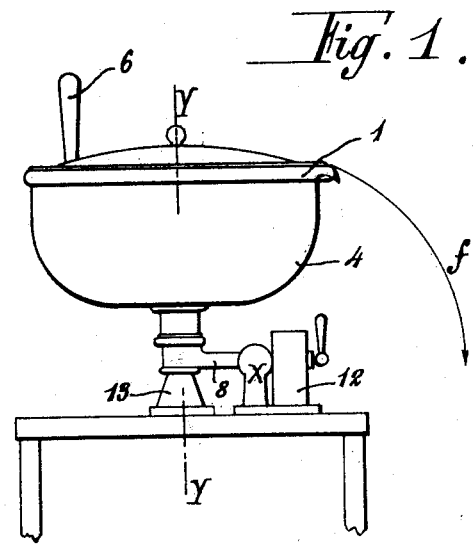
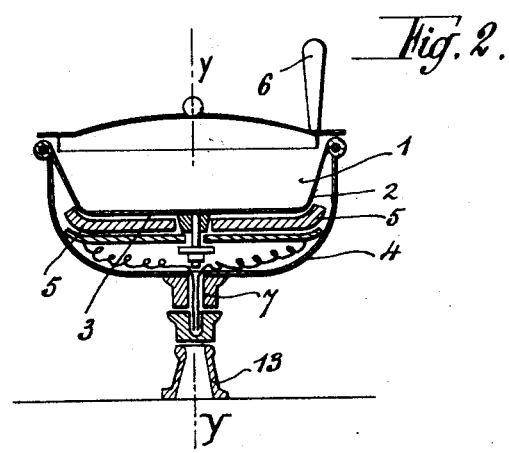
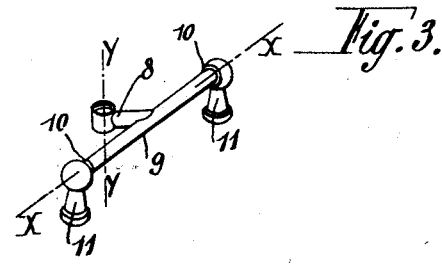

1,776,304

UNITED STATES PATENT OFFICE

RENÉ VANNIER, OF PARIS, FRANCE, ASSIGNOR TO SOCIÉTÉ ANONYME LES CONSTRUCTEURS ASSOCIES DE PARIS, OF PARIS, FRANCE

ELECTRIC COOKING DEVICE

Application filed April 30, 1929, Serial No. 359,247, and in France May 24, 1928.

The present invention relates to improvements in electric cooking devices, chiefly adapted for the preparation of food.

The said improvements, by which the efficiency of the apparatus is increased are essentially characterized by the fact that the lateral wall and the bottom of the receptacle are adapted to fit into and to thus close a heating chamber containing the electric heating elements which are adjacent the bottom of the said receptacle.

In the accompanying drawings and by way of example:

Fig. 1 is an elevational view of a cooking apparatus comprising the improvements according to the invention.

Fig. 2 is a corresponding cross section.

Fig. 3 is a perspective view of the pivoting device for the cooking arrangement.

The receptacle 1 comprises a lateral wall 2 and a bottom 3, thus forming a hollow cover mounted on a vessel 4. The receptacle 1 is readily removable from the vessel 4. Both consist of good heat conducting substances, and preferably of pure nickel or nickel-plated copper. The space between the receptacle 1 and the vessel 4 contains the electric resistances 5 disposed under the bottom 3. The whole apparatus is so disposed that the calorific capacity of the receptacle 1 is reduced to a minimum, so as to assure a rapid conduction of heat. The exterior of the vessel 4 is polished to avoid losses by radiation.

The apparatus may be pivoted about by a handle 6, and for this purpose the construction is as follows.

The vessel 4 carries on its axis Y—Y a lower tubular part 7 for the insertion of the wires connected to said heating resistances 5, and the part 7 carries a hollow arm 8 secured to a hollow cross-bar 9, which also carries the wires and serves as a horizontal pivoting axle whose center line is X—X. The ends of the said bar 9 engage (with packing joints) in bearings formed in the uprights 11 which are hollow, and one of these carries the said electric wires. At the front part is disposed a switch 12 used with the wires. The other upright may carry a pilot lamp disposed at the terminals of the work circuit. In this manner an ironclad disposition is afforded for the whole circuit. When in normal use, the apparatus rests upon the base 13.

The said receptacle may be given any form, either deep, less deep, shallow or other form.

Analogous receptacles may be placed in adjacent position so as to form a composite apparatus by which all cooking may be performed.

A very high efficiency is thus afforded, and the aliments may be cooked with a small power. In the known devices, the usual electric heating plate on which the cooking vessel is mounted shows an efficiency of only 20 per cent at the maximum, whereas the apparatus according to the invention has an efficiency of at least 80 per cent. This represents a great saving and thus the electric power required for such cooking can be much reduced.

It is thus observed that the invention affords all the desired objects, and even offers other advantages.

Obviously, the said apparatus is susceptible of various modifications without departing from the spirit of the invention.

I claim:

1. A cooking apparatus comprising a base, a rocking support arranged at one side of the base, an arm projecting laterally from said support to rest on the base, a vessel carried by said arm, and means for heating the vessel.

2. A cooking apparatus comprising a vessel having a central depending boss, a base below the vessel, a rocking support at one side of the base, a lateral arm on said support adapted to rest on the base, the boss on the vessel resting on the end of the arm, electric heating elements in the vessel, and conductors leading through the arm and the boss to said heating elements.

In testimony whereof I affix my signature.

RENÉ VANNIER.